3,380,835
METALIZING COMPOSITIONS

Oliver A. Short, Wilmington, Del., assignor to E. I. du Pont de Nemours and Company, Wilmington, Del., a corporation of Delaware No Drawing. Continuation-in-part of application Ser. No. 468,129, June 29, 1965. This application Dec. 20, 1965, Ser. No. 515,215
11 Claims. (Cl. 106—1)

ABSTRACT OF THE DISCLOSURE

Metalizing compositions comprising a dispersion of a catalytically inactive noble metal, powder in an inert liquid vehicle are produced. The noble metal powders are rendered inactive by (1) heat treatment or by (2) treatment with certain metal oxides (e.g., arsenic trioxide, antimony trioxide).

This application is a continuation-in-part of my copending application, Ser. No. 468,129, filed June 29, 1965, now abandoned. This invention relates to platinum and palladium metalizing compositions particularly suitable for application to "green" ceramic sheets employed in the production of multilayer monolithic ceramic circuit components.

Deyrup U.S. Patent 2,389,420 describes the preparation of multiplate monolithic ceramic capacitors employing a technique involving spraying a slurry of a finely divided ceramic dielectric material onto a base surface, drying the same, then superimposing thereon a layer of finely divided conductive metal and liquid carrier, e.g., silver, in paste form. The silver layer is usually applied by screen stencilling the silver paste in the desired pattern, later to serve as the capacitor electrode or plate. As many alternate layers as desired of ceramic dielectric and silver electrodes may be built up in this manner, with the bottom-most and uppermost layers being dielectric layers. Alternate silver layers are offset slightly so as to be exposed at opposite sides of the capacitor structure, which structure is then fired at the fusing or sintering temperature of the dielectric material to form a monolithic capacitor structure. The alternate electrode layers or plates exposed at opposite sides of the fired capacitor are then silvered with a silver paste or paint. After again being fired, the fired silvered edge on one side connects all alternate plates exposed on that side, while the opposite silvered edge similarly connects all alternate plates exposed on that side. Lead wires are then attached, e.g., by soldering, to the silvered edges. Alternatively, silvering of the edges to which the alternate silver layers are exposed can be effected before the first firing, in which case only a single firing is necessary.

An improved modification of the method of the above patent involves the use of thin preformed sheets, films or strips of "green" ceramic dielectric material which consists of finely divided ceramic dielectric material and temporary binder. Such sheets are first coated, e.g., by screen stenciling, with a novel metal electrode coating which may also be referred to as a screening ink or metalizing composition in the desired pattern, following which the sheets are stacked to provide alternate dielectric and electrode layers, with alternate electrode layers exposed on opposite edges of the stack. The stack is compressed under a pressure of about 100 to 2,000 p.s.i., then fired to provide the monolithic multiplate capacitor. Since the stack is many layers thick, it is difficult to remove all the liquid carrier which may also be referred to as a vehicle used with the ink without forming blisters. All of the vehicle must be removed very slowly to allow time for diffusion through the many layers to the top and bottom surface or parallel to the layers to the edge of the stack. Then the temporary binder must be decomposed and allowed to diffuse. Finally, the stack must be fired to form a monolithic unit. The noble metal component of the electrode used should be a metal which will not melt at the firing temperature. The edges with exposed electrodes are metalized using a conductive metal paint. This can be done before the stack is fired, or after such firing, depending upon the firing temperature required and the metal paint used. If the edges are so metalized after the stack is fired, a second firing will be required to fire such conductive paint to the edges. It is to this improved modification of producing capacitors that the present invention is principally directed.

Heretofore, metalizing compositions employed in the manufacture of capacitors with the use of "green" ceramic dielectric sheets have generally contained silver particles as the metal constituent thereof. Any of a number of vehicles have been employed with the silver particles including at least one type which does not dissolve the binder material of the "green" dielectric sheets. With the selection and use of a carrier which does not dissolve the binder constituent of the "green" ceramic dielectric sheets, one cause of curling and blistering of the electrode-coated sheets is avoided, and high quality, low temperature fired ceramic capacitors comprising silver plates are obtainable.

More recently, demands for capacitors and electrical devices having improved electrical properties have made it necessary to employ as the dielectric, material which must be fired or sintered at temperatures in excess of the melting point of silver (M.P. 961° C.) and even that of gold (M.P. 1065° C.) Attempts to use silver and gold at firing temperatures in excess of 1200° C. has resulted in the metal melting into globules and forming a noncontinuous layer or path. The selection and use of noble metal powders such as platinum black and palladium black having melting points in excess of 1200° C. do not produce electrical devices of high quality. Curling, cracking and deformation of the "green" ceramic dielectric sheets were observed after the firing of the assembled stacks, even when carriers which do not dissolve the binder constituent of the "green" ceramic dielectric sheets were employed. For example, in the manufacture of barium titanate capacitors, the ultimate firing temperature must be in excess of 1200° C., and gradual heating for a period of 1 to 7 days is required with existing binders and carriers before the final temperature can be reached. It has been found that noble metals such as platinum (M.P. 1755° C.) and palladium (M.P. 1556° C.) when heated, catalyze the oxidation of components of both the carrier and binder. This catalytic action begins at a temperature within the range of 200 to 600° C. This causes local "hot spots" and the formation of gas pockets in the stacks. The final result is the formation of bubbles, blisters, delamination and short circuits in the devices being made.

It has been found that electrical devices free from the above defects can be obtained through the use of improved metalizing compositions of this invention which comprise palladium powder or platinum powder exhibiting reduced catalytic activity which enable the same to be used with inert carrier and binders without effecting distortion of the stacked "green" ceramic sheets during heating and firing. The reduced catalytic activity of the metal powder constituent of the metalizing composition can be effected by at least two techniques; namely, thermal treatment of the metal powders, and the addition of chemical agents to the metal powders.

Of these, the thermal treatment which consists of preheating the metal powder in a suitable atmosphere within a temperature range and for a certain time duration is preferred. The second technique for reducing the catalytic quality of the metal powder is obtained by mixing with the platinum or palladium powders certain metal oxides which interfere with the ability of the platinum and palladium to catalyze the oxidation of the carrier and binders with which they are used. Each of these techniques for deactivating the noble metal constituent of the metalizing compositions of this invention will be described in detail hereinafter.

The term "catalytically deactivated powder" and various forms of this terminology such as "powder exhibiting reduced catalytic activity" as used in the specification and claims are intended to include not only powders otherwise catalytically active to the oxidation of components of the vehicle and binder with which they are used, which have undergone treatment which renders them inactive as to this oxidation; but also powders which have been conditioned so that on heating and firing after having been applied to "green" ceramic substrates they will not catalytically oxidize the vehicle and binder components with which they are used.

The noble metal powders which are mixed with carriers to provide the metalizing compositions may be composed solely of catalytically deactivated palladium, catalyticaly deactivated platinum, or catalytically deactivated alloys of platinum and palladium with themselves or with other noble metals. Mixtures of the aforementioned powders, or mixtures of one or more of the aforementioned powders with other noble metal powders or untreated catalytically active powders of platinum or palladium can be used provided the ratio of treated catalytically inactive to catalytically active powders is sufficiently high to reduce the overall catalytic activity of the powder to a tolerable level, i.e., a level at which curling, blistering, cracking and delamination of the "green" ceramic sheets does not occur. The metal powders used in this invention must consist essentially of particles which have melting points higher than the sintering temperature of the ceramic material with which they are used in order to avoid the formation of discontinuous electrical paths or layers.

Generally, the particle size of the metal powders should not exceed 40 microns in diameter, and particle sizes in the range of 0.1 to 5 microns are distinctly preferred.

Before describing in detail the metal constituents of the metalizing compositions of this invention and the methods of rendering the same catalytically inactive, the "green" ceramic dielectric sheets, their constituents and the carrier of the metalizing composition will be first described.

By "green" ceramic dielectric material is meant an unfired admixture, e.g., a preformed shape such as a sheet, film or strip, comprising a particulate ceramic dielectric material such as glass, alkaline earth metal titanate, lead zirconate or titanium dioxide, and a temporary resinous organic binder. The "green" ceramic dielectric material is generally prepared by blending the desired ceramic dielectric material in powder form with a solution of the resinous binder, and casting the blend as a thin sheet from which the solvent is vaporized. The sheet, when dried and stripped from the casting plate, may vary in thickness from about 1 to 30 mils and will generally consist of 80 to 90% ceramic dielectric material and 10 to 20% resin binder, by weight.

While the novel metal powders of this invention will enable the use of particulate ceramic dielectric material having sintering temperatures above the melting points of silver and gold, the powders of this invention can be used with ceramic dielectric materials having sintering temperatures lower than these values and thus provide alternate uses for these low temperature sintering materials.

The term "temporary resinous organic binder" refers to that component of the "green" ceramic dielectric material which binds the particulate dielectric material together and forms the body portion thereof. Any of the binders presently known to the industry can be used in conjunction with the novel metalizing powders of this invention. The temporary binder used should yield a sheet which is flexible; otherwise, cracks and defects may occur during the handling thereof. In addition, the binder should have good pyrolytic properties. Solid ethylcellulose resin, solid polymers of acrylate or methacrylate ester of a 1 to 4 carbon aliphatic alcohol and polyvinyl butyral possess these qualities and have been proven to be satisfactory binders.

The carriers which generally constitute from 20 to 65% by weight of the metalizing compositions of this invention may be any organic liquid presently known to the industry for the printing of "green" dielectric ceramic sheets. Such vehicles should be inert towards the noble metal constitutent of the metalizing composition. Liquids which can be used in the metalizing compositions of this invention include the higher alcohols (at least 8 carbons); esters of such alcohols, for example, the acetates and propionates; the terpenes, pine oil, alpha- and beta-terpineol, aliphatic petroleum naphthas boiling at 150 to 320° C., and the like; and solutions of resins such as the polyterpene resins, for example, polymerized alphapinene, the polymethacrylates of the lower alcohols, or ethylcellulose, in solvents such as pine oil, the above naphthas, for example, kerosene and diesel fuel, the alkyl ethers of ethylene glycol, the diethylene glycol esters such as ethylene glycol butyl ether acetate ($C_4H_9$—O—$CH_2CH_2$—$OOCCH_3$) and diethylene glycol ethyl ether acetate $$(C_2H_5—O—(CH_2)_2—O—(CH_2)_2—OOCCH_3)$$

The carrier which may also be referred to as a vehicle may contain volatile liquids, such as kerosene, previously mentioned, xylene, toluene, and the like, to promote fast drying or setting after application, or they may contain waxes, thermoplastic resins or the like materials which are thermofluid so that the composition may be applied at an elevated temperature to a relatively cold substrate upon which the composition sets immediately.

The vehicle chosen should be one which will not deleteriously dissolve or attack the temporary resin binder of the substrate to which the metalizing composition is applied. When the resin binder of the "green" ceramic substrate is a solid ethylcellulose resin or a solid polymer of an acrylate or methacrylate ester of a lower aliphatic alcohol, as is most generally the case, a preferred vehicle employed with the platinum or palladium metalizing composition is a 20 to 70% solution of a polyterpene resin (mol. wt. of 350 to 870) in an aliphatic petroleum naphtha boiling in the range 150 to 320° C. or beta-terpineol.

Another vehicle, even more highly preferred when the resin binder of the "green" ceramic dielectric material is ethylcellulose, methacrylate polymers or acrylate polymers than is the polyterpene resin-petroleum naphtha vehicle, includes a solvent mixture of kerosene distillate having a boiling point ranging from 200 to 240° C. and aromatic naphtha having a boiling point ranging from 180 to 200° C. and a resin mixture of Staybelite (hydrogenated rosin) and ethylcellulose or Staybelite ester of glycerine and ethylcellulose. This vehicle consists of from 60 to 70% solvent of which 70 to 90% and preferably 80% is the kerosene distillate and 30 to 40% resin of which 4 to 7% and preferably 6% is ethylcellulose. This vehicle generally constitutes 35 to 60% and preferably 40 to 50% of the metalizing compositions in which it is used.

The catalytically active powders to be treated in accordance with this invention are finely divided in form. Generally, the particle size of these powders should not exceed 40 microns in diameter and particle sizes in the range of 0.1 to 5 microns are distinctly preferred.

As previously indicated, the catalytic activity of the finely divided platinum and palladium, available commercially as platinum black and palladium black, can be reduced by different techniques. The preferred method, which consists of heat treating the platinum black and palladium black, will now be described and several examples which illustrate the utility of the treated powders will be given; thereafter, another method will be described and the utility of the resulting powder for the present purposes illustrated.

The catalytic activity of platinum black can be destroyed by heating the same at a temperature within the range of 600 to 900° C. for from 20 minutes to 1 hour. Heating at temperatures between 600 to 700° C. provides treated powders which are definitely superior to the powders heated at temperatures within the range of from 700 to 900° C. Generally, shorter heating periods are used with the higher temperatures and longer heating periods with the lower temperatures. Platinum black heated at 625° C. for 30 minutes is definitely preferred. Heating at temperatures below about 600° C. does not result in deactivation and heating at temperatures in excess of 900° C. produces a treated powder which, when mixed with the vehicles above-mentioned, provides metalizing compositions which can not be applied to form a smooth continuous bubble-free coating. It is thought that the powder particles undergo crystal growth and that excess heating produces particles which are too coarse or have an insufficient surface area to mass ratio to form an adequate paste. It should be understood that the successful practice of this invention is in no manner dependent on the correctness of the crystal growth theory. The catalytically deactivated platinum powder produced in accordance with this invention by heating at the temperatures and for the times indicated above, resulted in the production of particles of increased coarseness as compared with untreated platinum black. After crushing and grinding (if these steps are required for the same to pass through, for example, a 325 mesh screen), the powders can be used alone with a number of vehicles to form excellent metalizing compositions usable with this mesh screen. It has been found advantageous to use mixtures of untreated powder and treated powder with certain vehicles especially those which do not include resinous components to improving the printing quality of the resulting metalizing compositions. It has been observed that metalizing compositions wherein the catalytically inactive particles constitute as little as 25% of the total amount of active and inactive platinum powder, exhibit a sufficiently reduced catalytic activity to provide electrical devices having excellent electrical properties. Preferably, however, the treated particles should be present in amounts within the range of from 50 to 100% of the total metal constituent of the metalizing composition.

The catalytic activity of palladium powder may be reduced in a manner similar to the treatment employed in the reduction of the catalytic activity of the platinum powder. In treating palladium black, the temperature used must be about 500° C., i.e., within the range of 450 to 550° C.; and the time period used must be within the range of 20 minutes to one hour; otherwise, the activity is not impaired or the powder particles sinter together and can not be used. In addition, the heating must be done in an inert atmosphere since at about 200° C. palladium exposed to air oxidizes. Argon gas has been a very effective inert atmosphere for the heating of palladium, and helium and nitrogen are also satisfactory. Heat treatment of palladium powder results in an increased coarseness thereof. Accordingly, the treated powder is crushed and ground as needed until it will pass through the screen (usually 325 mesh) which is to be used to print the metalizing composition. While the treated palladium powder can be used as the sole metal constituent of the metalizing composition, it has been found advantageous with certain vehicles to use untreated powder therewith to form metalizing compositions which are to be screen stencilled. Catalytically inactive palladium particles, when used in combination with untreated palladium black, should always be present in an amount equal to at least 40% of the total metal content of the metalizing composition and preferably in amounts within the range of 50 to 100%.

Table I lists platinum metalizing compositions, exemplary of the invention, which were prepared by mixing appropriate proportions of the indicated vehicle constituents with catalytically deactivated platinum powder, platinum black and mixtures thereof in a three-roll paint mill which effected thorough dispersion of the powders in the vehicles. In Examples 3 and 4 of Table I, the platinum black employed has a coarseness equivalent to that of the heat treated platinum powder of the other examples.

Table II lists palladium metalizing compositions which were prepared similarly as the platinum metalizing compositions, by mixing appropriate proportions of the indicated vehicle constituents with heat treated palladium, palladium black and mixtures thereof in a three-roll paint mill which effected thorough dispersion of the powders in the vehicle.

TABLE I.—PLATINUM METAL METALIZING COMPOSITION
[Weight Percent]

| Example | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Platinum Black (Untreated) (0.1–2 microns) | 60 | 30 | | | 45 | 15 | | | 20 | 30 | | 32.5 | 43 | | 25 | 37.5 |
| Platinum Powder [1] | | 30 | | | 15 | 45 | 60 | 40 | 20 | 10 | 65 | 32.5 | 22 | 50 | 25 | 12.5 |
| Platinum Black (Untreated-Coarse) | | | 60 | 60 | | | | | | | | | | | | |
| Polymerized Alpha pinene (Melting Point 85° C.) | 24 | 28 | 28 | 28 | 28 | 28 | 36 | | | | | | | | | |
| Diesel Fuel | 16 | 12 | 12 | 12 | 12 | 12 | 4 | | | | | | | | | |
| Kerosene distillate (Boiling Point 200–240° C.) | | | | | | | | 29 | 29 | 29 | 19 | 19 | 19 | 25 | 25 | 25 |
| Aromatic Naphtha (Boiling Point 180–200° C.) | | | | | | | | 8 | 8 | 8 | 5 | 5 | 5 | 6 | 6 | 6 |
| Staybelite Ester No. 5 (hydrogenated rosin ester of glycerine) | | | | | | | | 19 | 19 | 19 | 9 | 9 | 9 | 16 | 16 | 16 |
| Ethylcellulose | | | | | | | | 4 | 4 | 4 | 2 | 2 | 2 | 3 | 3 | 3 |

[1] This platinum powder was prepared by heating platinum black having an initial particle size of 0.1 to 2 microns in air at 700° C. for 30 minutes. The resulting powder was ground and passed through a 325 mesh screen.

TABLE II.—PALLADIUM METAL METALIZING COMPOSITIONS
[Weight Percent]

| Example | 17 | 18 | 19 | 20 | 21 | 22 | 23 | 24 | 25 | 26 | 27 | 28 | 29 | 30 |
|---|---|---|---|---|---|---|---|---|---|---|---|---|---|---|
| Palladium Black (Untreated) (0.1–2 microns | 60 | 30 | 30 | 30 | 36 | | 20 | 24 | | 32.5 | 39 | | 25 | 30 |
| Palladium Powder [1] | | [2] 30 | [3] 30 | [4] 30 | [2] 24 | [2] 40 | [2] 20 | [2] 16 | [2] 65 | [2] 32.5 | [2] 26 | [2] 50 | [2] 25 | [2] 20 |
| Polymerized Alpha pinene (Melting Point 85° C.) | 24 | 24 | 24 | 24 | 32 | | | | | | | | | |
| Diesel Fuel | 16 | 16 | 16 | 16 | 8 | | | | | | | | | |
| Kerosene distillate (Boiling Point 200–240° C.) | | | | | | 29 | 29 | 29 | 19 | 19 | 19 | 25 | 25 | 25 |
| Aromatic Naphtha (Boiling Point 180–200° C.) | | | | | | 8 | 8 | 8 | 5 | 5 | 5 | 6 | 6 | 6 |
| Staybelite Ester No. 5 (hydrogenated rosin ester of glycerine) | | | | | | 19 | 19 | 19 | 9 | 9 | 9 | 16 | 16 | 16 |
| Ethylcellulose | | | | | | 4 | 4 | 4 | 2 | 2 | 2 | 3 | 3 | 3 |

[1] These palladium powders were prepared by heating palladium black having an initial particle size of 0.1 to 2 microns in argon for 30 minutes at the temperature values indicated. The resulting powders with the exception of Example 20 were ground and passed through a 325 mesh screen. The powder of Example 20 could not be reduced to a size which would pass through the 325 mesh screen.
[2] Heated to 500° C. [3] Heated to 400° C. [4] Heated to 600° C.

The metalizing compositions of Tables I and II were applied to "green" ceramic dielectric material and fired to temperatures in excess of those at which catalyzed oxidation of carrier and binder components in contact with palladium black and platinum black were observed to occur. The following Examples 31 through 65 identify the material employed, the test procedure used and the results observed.

EXAMPLE 31

The platinum metalizing composition of Example 1 was applied through a 325 mesh screen stencil to a sample of a sheet of 90% barium titanate powder and 10% methyl methacrylate. The printed sheet was fired at 760° C. for 45 minutes. Approximately 17½ minutes of this 45 minute heating time was employed to heat-up to 760° C. and another period of approximately 17½ minutes was employed to cool-down to room temperature. The resulting article was badly curled, cracked and blistered.

EXAMPLE 32

The metalizing composition of Example 2 was applied through a 325 mesh screen stencil to a sample of the 90% barium titanate-10% methyl methacrylate sheet used in Example 16 and was fired at 760° C. for 45 minutes similarly as in Example 16. The resulting article consisted of a continuous smooth metallic electrode on a slightly sintered ceramic residue.

EXAMPLES 33 AND 34

The metalizing compositions of Examples 3 and 4 were applied through a 325 mesh screen stencil to a sample of the "green" ceramic sheet used in Example 31 and fired at 760° C. for 45 minutes similarly as in Example 31. The resulting articles were disrupted similarly as the articles of Example 31.

EXAMPLE 35

The metalizing composition of Example 5 was applied through a 325 mesh screen stencil to a sample of the "green" ceramic material of Example 31 and fired at 760° C. for 45 minutes similarly as in Example 31. The resulting article, although exhibiting minor cracks at the edge of the patterns, indicated that only slight catalytic activity occurred.

EXAMPLE 36

The metalizing composition of Example 6 was applied through a 325 mesh screen stencil to a sample of the "green" ceramic sheet used in Example 31 above. Although the ink used was extremely fluid and the printing properties were so poor that a smooth continuous bubble-free print was difficult to obtain, firing at 760° C. for 45 minutes similarly as in Example 31, resulted in a satisfactory article showing no evidence of the formation of "hot spots" or catalytic activity.

EXAMPLE 37

The metalizing composition of Example 7 was applied through a 325 mesh screen stencil to a sample of "green" ceramic sheet used in Example 31. Except for slower drying and high viscosity, this composition on firing as above resulted in the same high quality article as was obtained with Example 32.

EXAMPLES 38 THROUGH 46

The metalizing compositions of Examples 8 through 16, both inclusive, were separately applied through a 325 mesh screen stencil to samples of the "green" ceramic sheet of Example 31 and were fired at 760° C. for 45 minutes similarly as in Example 31. These metalizing compositions exhibited excellent printing properties and formed smooth continuous bubble-free prints. The articles produced consisted of continuous smooth metallic electrodes on slightly sintered ceramic residues.

EXAMPLE 47

The metalizing composition of Example 17 was applied through a 325 mesh screen stencil to a "green" ceramic dielectric sheet sample of 90% titanium dioxide and 10% methyl methacrylate and then fired at 760° C. for 45 minutes similarly as in Example 31. An article resulted which was curled, cracked and blistered.

EXAMPLE 48

In a test identical to that of Example 47, the metalizing composition of Example 18, when applied through a 325 mesh screen stencil to an identical titanium dioxide-methyl methacrylate sheet sample produced an article which had a smooth and continuous metallic electrode on the sintered ceramic residue.

EXAMPLE 49

A test of the metalizing composition of Example 19, as in Example 47, resulted in an article which was badly disrupted. The article indicated that there was no decrease in the catalytic activity of the powder used.

EXAMPLE 50

An attempt to apply the metalizing composition of Example 20 through a 325 mesh screen stencil to a sample of the "green" ceramic sheet used in Example 47 failed. The metal powder of this composition was so badly sintered that it could not be recrushed to a size which could be applied.

EXAMPLE 51

The metalizing composition of Example 21 was applied through a 325 mesh screen stencil to a sample of the "green" ceramic sheet of Example 47 and was fired at 760° C. for 45 minutes similarly as in Example 31. The resulting article showed no evidence of formation of "hot spots" or catalytic activity.

EXAMPLES 52 THROUGH 60

The metalizing compositions of Examples 22 through 30, both inclusive, were applied through a 325 mesh screen stencil to separate samples of the "green" ceramic sheet used in Example 47. They were fired at 760° C. for 45 minutes similarly as in Example 31. The metalizing compositions showed excellent printing properties and resulted in the formation of articles which exhibited no "hot spots" or catalytic activity.

EXAMPLES 61 AND 62

Two built-up capacitors were made using 8 layers of the "green" ceramic sheet of Example 31 in each instance. In one case the interdisposed metalizing composition used was the composition of Example 1 and in the other case the metalizing composition of Example 2. Each layer was separately printed and dried for 2 hours at 100° C. The capacitors were then assembled and compressed with a force of 500 p.s.i. The stacked layers were then dried overnight at 100° C., were fired to 760° C. over a period of about 6 hours and were finally heated to 1260° C. over a 16-hour period. Each capacitor, after their electrical properties had been measured, was sawed in half with a diamond wheel and inspected for blisters and delamination. The capacitor made with the metalizing composition of Example 1 had low capacitance and many blisters. The capacitor made from the metalizing composition of Example 2 was a well formed monolithic unit with nearly double the capacitance of the other capacitor.

EXAMPLES 63 THROUGH 65

Three built-up capacitors were made using the metalizing compositions of Examples 8, 12 and 16. In each instance, 8 layers of the "green" ceramic sheet of Example 31 were used. The procedure for assemblying, drying, firing and testing the capacitors made from these metals was identical with the procedures set forth in Examples 61 and 62 above. Each capacitor was a well formed monolithic unit exhibiting nearly twice the capacitance of the capacitor of Example 61 which had been formed with the metalizing composition of Example 1.

The improved platinum and/or palladium metalizing compositions of the invention, which may also be referred to as conductive metal paints, in addition to being produced in the manner described in detail above, can be produced by forming dispersions of intimate mixtures of platinum and/or palladium black with finely divided arsenic trioxide and/or antimony trioxide in an inert organic vehicle. It has been found that the presence of arsenic trioxide or antimony trioxide in such compositions greatly inhibits or prevents the objectionable bubble formation and delamination of stacked ceramic sheets when electrode coatings or printings of the compositions on the sheets are dried and fired.

The arsenic trioxide additive should be present in the composition in an amount equal to at least 2% of the weight of the platinum or palladium, since worthwhile improvements in the properties of the compositions are not realized with lesser amounts. On the other hand, amounts thereof greater than about 15%, based upon the weight of the metal, will seldom be used since such greater amounts increase the electrical resistance of the fired coatings excessively. The preferred amounts range from 3 to 6%. Antimony trioxide is somewhat less effective than arsenic trioxide. However, amounts thereof from 4 to 15%, preferably 5 to 9%, are beneficial.

The platinum and/or palladium metal contents of these compositions containing arsenic trioxide and/or antimony trioxide may be varied considerably but generally will range from 45 to 70%, preferably 50 to 65%, based on the total weight of the composition. The metal should be employed in finely divided form. As mentioned above, the particle size of the metal should not exceed 40 microns in diameter and particle sizes in the range of 0.1 to 5 microns are distinctly preferred. The arsenic trioxide and antimony trioxide additives should also be in finely divided or powder form, and powders of a particle size not exceeding 50 microns are suitable although material of particle sizes in the range 0.1 to 20 microns are preferred.

The compositions are formulated by thoroughly suspending the metal powder and the arsenic trioxide or antimony trioxide in a suitable organic vehicle. A convenient way of effecting the suspension is to mix approximate proportions of the metal powder, the arsenic trioxide or antimony trioxide and the vehicle in a 3-roll paint mill. The composition will generally contain from 45 to 70% metal powder and the above stated amounts of the $As_2O_3$ or $Sb_2O_3$ additive, based on the weight of metal powder, with the balance being vehicle, e.g., a 20 to 70% solution of a polyterpene resin in an aliphatic petroleum naphtha solvent.

Any of the organic vehicles commonly employed in preparing platinum or palladium metalizing compositions can be employed, the choice of vehicle being governed by the particular use intended for the final composition. Such vehicles should be inert towards the noble metal powder during application, prefiring and firing on the ceramic substrate, any of the many organic vehicles previously proposed for platinum or palladium metallizing compositions may be used.

In the following examples as well as elsewhere in the specification and claims, all percentages are by weight.

EXAMPLE 66

A platinum paint was formulated consisting of 60% platinum powder of particle size 0.1 to 2 microns, and 40% of a vehicle consisting of a 60% solution of polymerized pinene (mol. wt., about 580; melting point, about 85° C.) in beta-terpineol. An amount of antimony trioxide equal to 3% of the weight of the paint was then thoroughly mixed into the paint. Using the screen stencil technique, prints of the resulting paint were applied to various "green" ceramic sheets composed of powdered titanate dielectric powders with polymethacrylate, ethylcellulose and polystyrene types of binders. The printed sheets were then dried and fired at about 1300° C. Similar printed sheets were prepared with a platinum paint of the same composition except that it contained no antimony trioxide. The entire surfaces of the prints made with the latter paint became red hot as the result of spontaneous combustion when the prints were simply dried in air. In contrast, such spontaneous combustion was very greatly reduced in the prints from the paint containing the antimony trioxide. The addition of 5% $Sb_2O_3$ to the paint completely eliminated such spontaneous combustion.

EXAMPLE 67

An experiment similar to that of Example 66 showed that the addition of 2% arsenic trioxide to the platinum paint completely eliminated the pyrophoric nature of the paint, i.e., the occurrence of spontaneous combustion during the drying of the prints.

EXAMPLE 68

A paint similar to Example 66 but containing 60% palladium instead of platinum, was pyrophoric with 1% $As_2O_3$ but not with 2.5% based on the weight of the paint. It was also pyrophoric with 2% $Sb_2O_3$ but not with 5%.

EXAMPLE 69

Various oxides were tested in place of $As_2O_3$ and $Sb_2O_3$ at 20% concentrations in the platinum paint of Example 66. They showed no evidence of reducing the pyrophoric nature of the paint. The oxides tried were $Bi_2O_3$, $SiO_2$, $GeO_2$, $SnO_2$, PbO, $In_2O_3$, $Tl_2O_3$, ZnO, CdO, $TiO_2$, $ZrO_2$, $Cr_2O_3$, $MoO_3$, $WO_3$, $Fe_2O_3$, $Co_2O_3$ and NiO.

EXAMPLE 70

The most common poisons for platinum catalysts are sulfur and selenium, either in elemental form or as high boiling organic compounds. The use of 50% elemental sulfur or selenium had no effect on the pyrophoric nature of the platinum or palladium paints. $NH_4CNS$, a terpene mercaptan and a terpene sulfide were also ineffective.

Since it is obvious that many changes and modifications can be made in the above-described details without departing from the nature and spirit of the invention, it is to be particularly understood that this invention is not to be limited to said details except as set forth in the appended claims.

I claim:

1. A metalizing composition comprising a dispersion of a catalytically inactive noble metal powder wherein the particles of the powder comprise a metal selected from the group consisting of palladium and platinum, in an inert liquid vehicle which constitutes from 20 to 65% by weight of the metalizing composition, said noble metal powder having been made catalytically inactive by subjecting said powder to a treatment which inactivates the ability of said metal powder to catalyze the oxidation of organic materials present when the metalizing composition is fired.

2. A metalizing composition according to claim 1 wherein the metal powder has a particle size in the range of 0.1 to 5 microns.

3. The metalizing composition of claim 1 wherein the noble metal powder comprises catalytically inactive particles and catalytically active particles and wherein the catalytically inactive particles are present in an amount within the range of from 50 to 100% of the total metal content of the metalizing composition, when said catalytically inactive particles are palladium, the palladium has been inactivated by heating in an inert atmosphere, and when said catalytically inactive particles are platinum, the particles have been inactivated by heating.

4. A metalizing composition according to claim 1 wherein the noble metal powder contains palladium, and the palladium has been catalytically inactivated by heating at a temperature within the range of 450–550° C. in an inert atmosphere.

5. The metalizing composition of claim 4 wherein the noble metal powder comprises catalytically inactive particles and catalytically active particles and wherein the catalytically inactive particles are present in an amount within the range of from 40 to 100% of the total metal content of the metalizing composition.

6. The metalizing composition according to claim 1 wherein the noble metal powder contains platinum, and the platinum has been catalytically inactivated by heating at a temperature within the range of 600–900° C.

7. The metalizing composition of claim 6 wherein the noble metal powder comprises catalytically inactive particles and catalytically active particles and wherein the catalytically inactive particles are present in an amount within the range of from 25 to 100% of the total metal content of the metalizing composition.

8. A conductive metal paint comprising a 40 to 70% dispersion of a platinum or palladium metal powder, or a mixture of said metal powders, in an inert organic vehicle, said composition containing an oxide of the group consisting of arsenic trioxide and antimony trioxide, and the amount of said oxide, based on the weight of said metal powder, being 2 to 15% when said oxide is arsenic trioxide and 4 to 15% when said oxide is antimony trioxide.

9. A metal paint according to claim 8 wherein the metal oxide is arsenic trioxide.

10. A paint according to claim 8 wherein the metal powder is platinum powder and the oxide is arsenic trioxide.

11. A paint according to claim 8 wherein the metal powder is palladium powder and the oxide is arsenic trioxide.

References Cited

UNITED STATES PATENTS

| | | | |
|---|---|---|---|
| 2,429,088 | 10/1947 | Box | 117—227 |
| 2,551,712 | 5/1951 | Soby | 106—1 X |
| 2,683,673 | 7/1954 | Silversher | 117—227 X |
| 3,052,573 | 9/1962 | Dumesnil | 117—227 X |
| 3,099,575 | 7/1963 | Hill | 117—217 X |
| 3,211,584 | 10/1965 | Ehrreich | 117—227 |
| 3,248,345 | 4/1966 | Mones et al. | 252—514 |
| 3,289,291 | 12/1966 | Reed | 106—1 X |

ALEXANDER H. BRODMERKEL, *Primary Examiner.*

L. B. HAYES, *Assistant Examiner.*